United States Patent
Wang

(10) Patent No.: US 8,709,663 B2
(45) Date of Patent: Apr. 29, 2014

(54) CURRENT COLLECTOR FOR LEAD ACID BATTERY

(76) Inventor: Xiaogang Wang, Troy, MI (US)

( * ) Notice: Subject to any disclaimer, the term of this patent is extended or adjusted under 35 U.S.C. 154(b) by 476 days.

(21) Appl. No.: 12/776,615

(22) Filed: May 10, 2010

(65) Prior Publication Data

US 2011/0274969 A1 Nov. 10, 2011

(51) Int. Cl.
*H01M 4/73* (2006.01)
*H01M 4/68* (2006.01)
*H01M 4/56* (2006.01)
*H01M 10/18* (2006.01)

(52) U.S. Cl.
USPC .................. 429/241; 429/210; 429/225

(58) Field of Classification Search
USPC .............. 429/241, 234, 231.5, 209, 210, 225; 29/623.1, 623.5
See application file for complete search history.

(56) References Cited

U.S. PATENT DOCUMENTS

| | | | |
|---|---|---|---|
| 3,390,014 A * | 6/1968 | Eisler | 429/150 |
| 3,884,716 A | 5/1975 | Walker | |
| 4,221,854 A * | 9/1980 | Hammar et al. | 429/234 |
| 4,358,892 A * | 11/1982 | Turillon et al. | 29/623.5 |
| 4,683,648 A | 8/1987 | Yeh et al. | |
| 4,708,918 A | 11/1987 | Fitzgerald et al. | |
| 4,713,306 A | 12/1987 | Pinsky et al. | |
| 5,334,464 A | 8/1994 | Rowlette | |
| 5,339,873 A | 8/1994 | Feldstein | |
| 5,544,681 A | 8/1996 | Feldstein | |
| 5,643,696 A | 7/1997 | Rowlette | |
| 6,232,017 B1 | 5/2001 | Tsuchida et al. | |
| 6,316,148 B1 * | 11/2001 | Timmons et al. | 429/241 |
| 6,447,954 B1 | 9/2002 | Timmons et al. | |
| 6,566,010 B1 | 5/2003 | Bhardwaj et al. | |
| 6,586,136 B1 | 7/2003 | Bhardwaj et al. | |
| 6,617,071 B2 | 9/2003 | Chen et al. | |
| 6,979,513 B2 | 12/2005 | Kelley et al. | |
| 2002/0150822 A1* | 10/2002 | Marlow et al. | 429/241 |
| 2003/0235763 A1* | 12/2003 | Gonzalez et al. | 429/234 |
| 2004/0072074 A1* | 4/2004 | Partington | 429/231.5 |
| 2008/0187824 A1* | 8/2008 | Tomantschger | 429/122 |
| 2009/0130557 A1* | 5/2009 | Fujita | 429/209 |

FOREIGN PATENT DOCUMENTS

WO WO-2007/018183 * 2/2007 ............ H01M 4/68

OTHER PUBLICATIONS

"A low-cost lead-acid battery with high specific-energy", Martha et al., J. Chem. Sci., vol. 118, No. 1, Feb. 2006, pp. 93-98.*
"Development and Application of Carbon Nanotubes", Endo et al., Japanese Journal of Applied Physics, vol. 45, No. 6A, 2006, pp. 4883-4892.*

(Continued)

*Primary Examiner* — Kenneth Douyette
(74) *Attorney, Agent, or Firm* — Howard & Howard Attorneys PLLC

(57) ABSTRACT

A low cost, high specific energy and long cycle life lead acid battery includes polymer/metal current collectors. For intermediate electrodes, a current collector includes two polymer grids and a metal foil that is disposed between two grids, and for terminal electrodes, a current collector includes a polymer grid, a polymer sheet and a metal foil that is disposed between the polymer grid and sheet. The surfaces of the grids and metal foil are coated by different conductive and corrosion-resistant composites. The current collectors can be configured as monopolar or bipolar electrodes.

23 Claims, 6 Drawing Sheets

(56) References Cited

OTHER PUBLICATIONS

"Substrate Materials for bipolar lead/acid batteries", W.-H. Kao, Journal of Power Sources 70 (1998) 8-15.

"A lead-film electrode on an aluminum substrate to serve as a lead-acid battery plate", L.A. Yolshina et al., Journal of Power Sources 78 (1999) 84-87.

"Studies on a lead-acid cell with electrodeposited lead and lead dioxide electrodes on carbon", K. Das, A. Mondal, Journal of Power Sources 89 (2000) 112-116.

"Electroplated reticulated vitreous carbon current collectors for lead-acid batteries: opportunities and challenges", E Gyenge et al., Journal of Power Sources 113 (2003) 388-395.

"Bipolar batteries based on Ebonex technology", A.C. Loyns et al., Journal of Power Sources 144 (2005) 329-337.

"Evaluation of the electrochemical stability of graphite foams as current collectors for lead acid batteries", Young-Il. Jang et al., Journal of Power Sources 161 (2006) 1392-1399.

"Lead-acid cells with lightweight, corrosion-protected, flexible-graphite grids", B. Hariprakash, S.A. Gaffoor, Journal of Power Sources 173 (2007) 565-569.

* cited by examiner

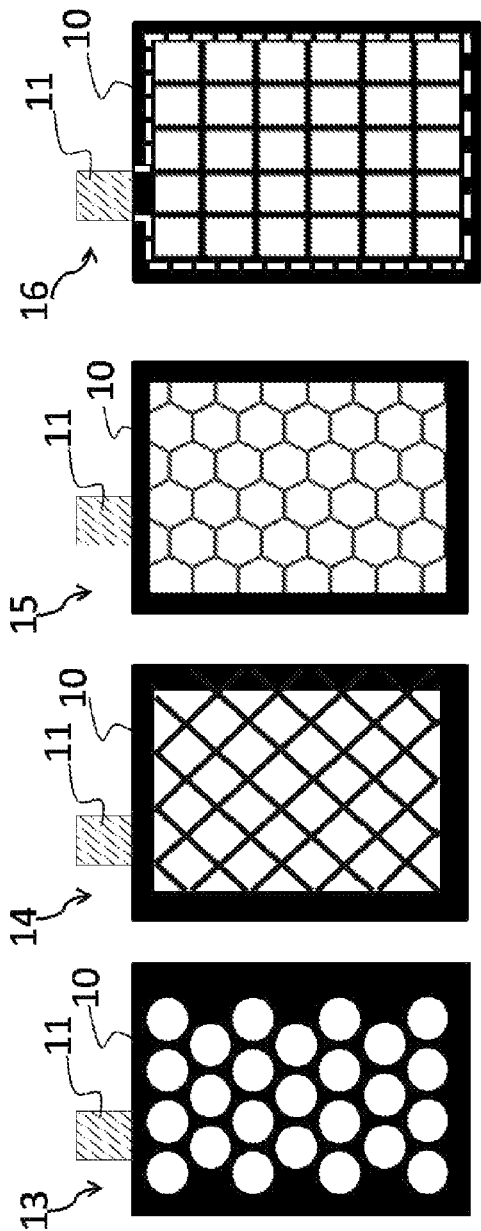

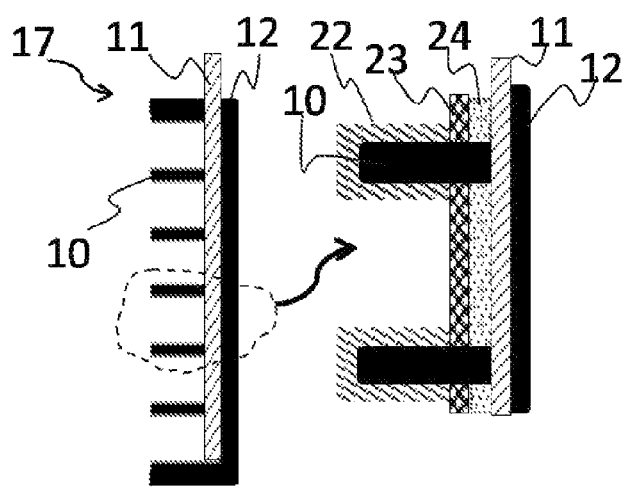
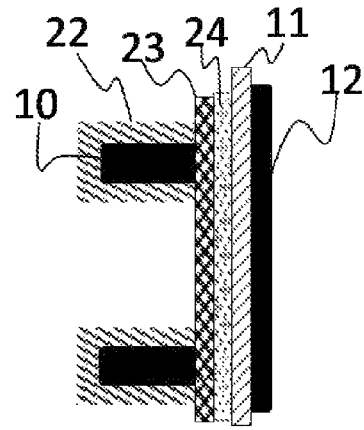
FIG. 2a  FIG. 2b
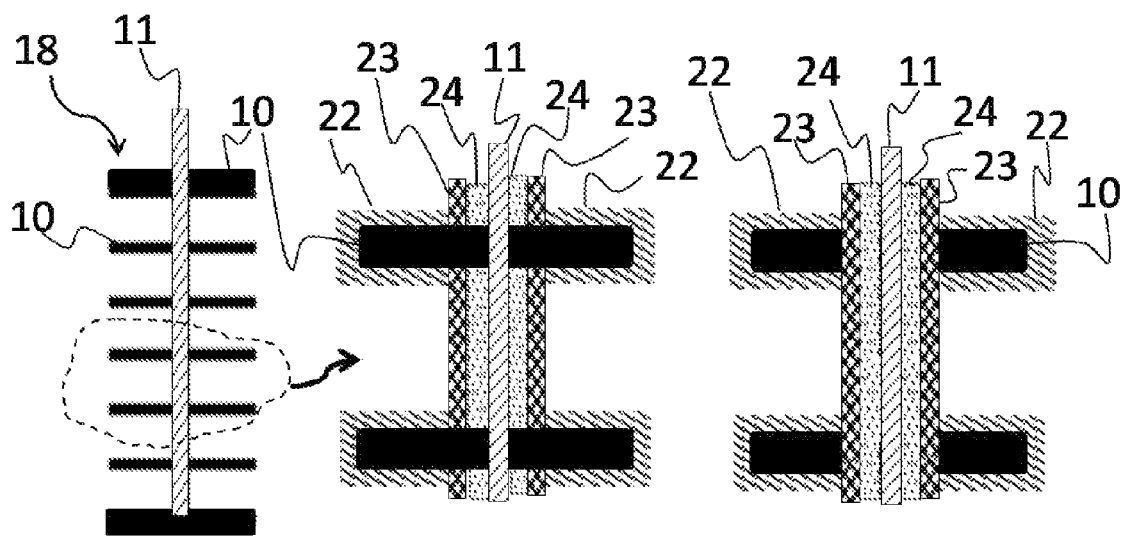
FIG. 2c  FIG. 2d

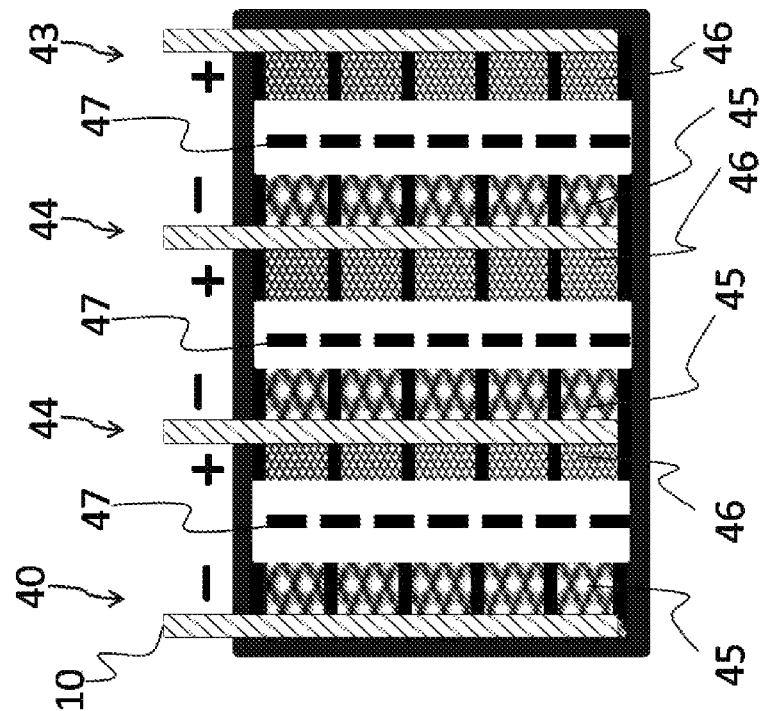
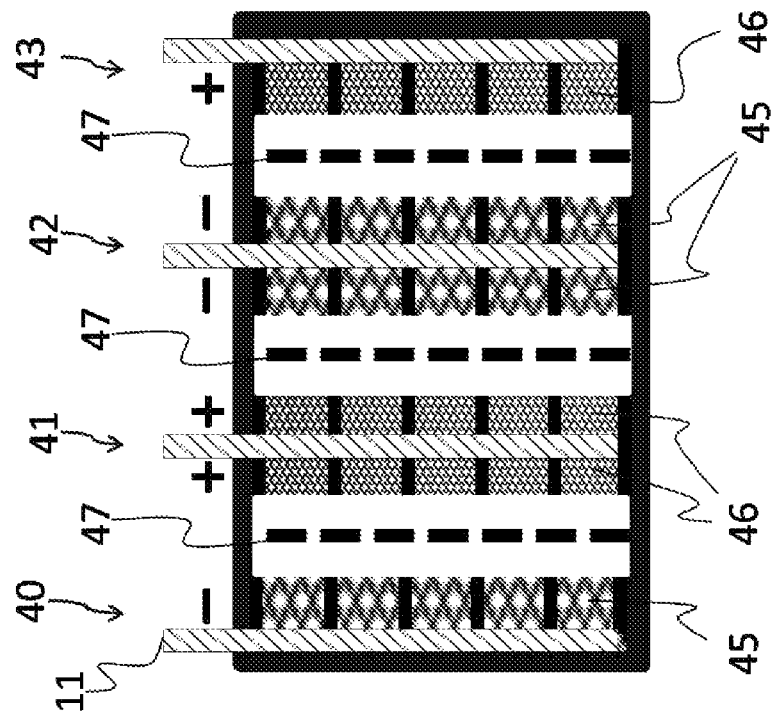

CURRENT COLLECTOR FOR LEAD ACID BATTERY

BACKGROUND OF THE INVENTION

1. Field of the Invention

The present invention relates generally to batteries and, more specifically, to advanced lead acid batteries used for vehicles having low cost, high specific energy, and long cycle life.

2. Description of the Related Art

It is known to provide storage batteries for vehicles for storing electrical energy for use by the vehicle. Lead acid, nickel-metal hydride, and lithium-ion batteries are three types of storage batteries for potential applications of electric vehicles (EV), hybrid electric vehicles (HEV), and plug-in hybrid electric vehicles (PHEV). Though lithium-ion batteries have high specific energy (Watt-hour/kilogram, Wh/kg) and have been broadly used in small electronic devices, such as cell phones and laptops, their high cost, performance, abuse tolerance and cycle life hamper them to be used in EV, HEV, and PHEV (See, Department of Energy 2009 Annual Progress Report for Energy Storage Research and Development). In addition, with present technology, it is difficult to recycle lithium-ion batteries. The cost of nickel-metal hydride batteries is high and their specific energy and cell efficiency are low although they have been used in HEV. The objectives of Department of Energy (DOE) are that by 2014 a PHEV battery should enable a 40-mile all-electric range and cost $3,400. The current cost of Li-based or Ni-based batteries is approximately a factor of three to five times too high on a kWh basis for PHEVs. The main costs for Li-based batteries are the high costs of raw materials and materials processing, cell and module packaging, and manufacturing. Therefore, it is desirable to develop new technologies to lower the costs of Li-based batteries.

Most of current automotive storage batteries are lead acid batteries due to their inexpensive, high power, reliable, and 98% recycling properties. However, the low specific energy and short cycle life of current commercial lead acid batteries resist them from being used for EV, HEV, and PHEV applications. If the specific energy and cycle life of the lead acid battery can be greatly increased, lead acid batteries should have a great advantage on other types of storage batteries. Therefore, it is desirable to develop low cost advanced lead acid batteries with high specific energy and long cycle life for EV, HEV, PHEV, and as well as other applications.

The lead acid battery has more than one hundred years of history. A lot of research on its properties has been done, and hundreds of papers, patents, and reports have been published and issued. The problems of low specific energy and short cycle life are still waiting to be solved. As is well known, low specific energy is mainly from two aspects. The first aspect is the heavy lead grids and the top lead that connects the plates and transfers electric current to and from the terminals. For example, the weight of the grids and top lead in a commercial SLI (start, light, ignition) lead acid battery is about 27% of the total battery weight, and the weight of the active materials is only about 36% of the total weight (*Handbook of Batteries* $3^{rd}$ edition, p 23.17, McGraw-Hill). The decrease of the weight of the grids and top lead can increase the weight rate of the active materials in the battery, and then increase the specific energy. The second aspect is the low utilization of active materials. The utilization rate of active materials in a current SLI lead acid battery is about 25% to 35%. Such low utilization rate is mainly decided by the structures of the grids (*Electrochemical Power Source*, M. Barak, pp 196, (The Institution of Electrical Engineers, London, 1980)). The short cycle life is mainly from the positive grid corrosion and the plate sulfation, and specifically the negative grid sulfation directly results in a dead battery.

In the last decade, considerable work has been done to decrease the weight of the grids of lead acid batteries and to improve their corrosion ability. One method is to use light metals, such as aluminum, copper, iron, titanium, or their alloys, as a core, which is covered with a thin lead film/foil layer. The early work was done by Henry Walker in U.S. Pat. No. 3,884,716, in which the aluminum is used as a core coated by a lead layer and one or more thin metal bonding layers between the aluminum and lead layer are also added. The same kind of work was done by John Timmons et al. in U.S. Pat. No. 6,447,954 and Ramesh Bhardwaj et al. in U.S. Pat. No. 6,586,136 and U.S. Pat. No. 6,566,010. John Timmons et al. in U.S. Pat. No. 6,316,148 also directly encapsulated aluminum or other metals with lead foils to form the grids. Yolshina et al. (Journal of Power Sources 78, 84 (1999)) directly deposited lead layers on the surfaces of aluminum and aluminum alloys as the grids. Lun-Shu Yeh et al. in U.S. Pat. No. 4,683,648 plated a lead layer on a titanium core to form the grid. Robert Feldstein in U.S. Pat. No. 5,339,873 and U.S. Pat. No. 5,544,681 used titanium as the core covered with a lead layer by means of ion implantation. However, after limited cycles, the sulfuric acid can penetrate the thin lead coatings on the metal cores and attack the metal cores.

In addition to using light metals as the grid/plate substrates as mentioned above, polymers, glass fibers, and carbon coated by lead/lead alloys have been used to construct the grids/plates for lead acid batteries. Richard Hammar et al. in U.S. Pat. No. 4,221,854 described a light grid that comprised a substrate made of a polymer laminated with lead foil. Kensaku Tsuchida et al. in U.S. Pat. No. 6,232,017 showed that polyamide glass fibers coated by a thin lead layer were used to construct a composite grid. The light carbon/graphite grids/plates coated by lead/lead alloys have been studied by several groups, such as Elod Gyenge et al. (Journal of Power Source 113, 388 (2003)) and Kaushik Das et al. (Journal of Power Source 89, 112 (2000)). The corrosion problem of the coated lead layer is similar to what the metal cores coated by lead have. The corroded thin lead layer has very large electrical resistance, which greatly lowers the performance of the batteries. B. Hariprakash et al. (Journal of Power Source 173, 565 (2007)) reported a study in which the coated lead layer is followed by a corrosion-resistant and conductive polyaniline layer by electrodeposition. However, they found that the adhesion between active materials and conductive polymer is weak and the cell capacity decreases rapidly beyond 30 cycles due to active material shedding. Rongrong Chen et al. in U.S. Pat. No. 6,617,071 also suggested coating conductive polymers on the grid surface to reduce the corrosion of lead metal components. In addition to the weak bonding of active materials on conductive polymers, conductive polymers are very expensive.

Using graphite foam as current collectors for lead acid batteries has been widely investigated, which can greatly decrease the weight of lead acid batteries. Kurtis Chad Kelley et al. in U.S. Pat. No. 6,979,513 described a method for making the carbon foam plates used in the battery. However, the evaluation of the electrochemical stability of the carbon foam current collectors for lead acid batteries by Young-Il. Jang et al. (Journal of Power Source 161, 1392-1399 (2006)) showed that in the voltage range of the positive electrode the graphite foams are not electrochemically stable due to intercalation of sulfuric acid into graphite, and hence graphite foam is not suitable for use as positive current collector for lead acid batteries. Young-Il. Jang et al. also showed that paste adhesion is weak and the cycle performance of the battery is poor. The discharge capacity is only ~25% of the available lead for the first cycle and decreases by half for second cycle.

Conductive melt oxides have been considered as a corrosion resistant layer. John Rowlette in U.S. Pat. No. 5,334,464 and U.S. Pat. No. 5,643,696 described adding a $SnO_2$ layer on the lead layer to protect lead from corrosion. Naum Pinsky et al. in U.S. Pat. No. 4,787,125 and Maurice Fitzgerald et al. in U.S. Pat. No. 4,708,918 also reported that tin oxide was used as the conductive and corrosion protection layers. However, the later investigation of Wen-Hong Kao (Journal of Power Source 70, 8-15 (1998)) reveals that prolonged exposure of $SnO_2$ in acid under positive potential results in passivation due to conversion of low valent tin or loss of the dopants. Wen-Hong Kao examined the chemical and electrochemical stability over 120 different ceramic materials, and he found that only silicides of Ti, Nb and Ta appear to be acceptable to be used in lead acid batteries. However, Wen-Hong Kao also found that the interaction/bonding between these materials and active materials is very weak, and the active materials fell off from the substrates after curing. Several methods were tried to improve paste adhesion, but the improvement is limited.

Though Wen-Hong Kao found that TiOx dissolves or decomposes in sulfuric acid, others show that titanium suboxides, $Ti_xO_y$, are good for anti-corrosion materials. However, as mentioned above, lacking paste adhesion is a serious problem for ceramic, $Ti_xO_y$, substrates. A. C. Loyns et al. (Journal of Power Sources 144, 329-337 (2005)) designed a special bipolar structure for the paste adhesion, in which the titanium suboxide composite is sandwiched between two lead alloy foils and the active materials are held by the conventional lead/lead alloy grids. Such plates are heavy, and the lead grid corrosion may damage the plates as the conventional lead acid batteries do.

Therefore, it is desirable to provide a new current collector and lead acid battery for vehicle applications. It is also desirable to provide a current collector and lead acid battery having a relatively low cost, high specific energy, and long cycle life. It is further desirable to provide a current collector and lead acid battery having improved mechanical properties. Thus, there is a need in the art to provide a current collector and lead acid battery that meets at least one of these desires.

SUMMARY OF THE INVENTION

It is, therefore, one object of the present invention to provide new lead acid batteries for EV, HEV, PHEV and as well as other applications.

It is another object of the present invention to provide a new lead acid battery having a low cost, high specific energy, and long cycle life.

To achieve one or more of the foregoing objects, the present invention is a current collector for an electrode plate of a lead acid battery. The current collector includes a plurality of polymer members and a metal foil disposed between the polymer members.

One advantage of the present invention is that a new lead acid battery having a low cost, high specific energy, and long cycle life. The low cost means that the total cost of the lead acid battery for dollars per Watt-hour ($/Wh) is close to that of a current commercial lead acid battery, which should be satisfactory to the DOE cost ($3400 by 2014) for a PHEV battery. Another advantage of the present invention is that the lead acid battery uses inexpensive materials for the current collectors, and low cost methods of manufacturing the current collectors and batteries. The high specific energy means that the specific energy of the lead acid batteries of the present invention is much higher (two to three times) than that of current commercial lead acid batteries. Yet another advantage of the present invention is that lead acid battery has a polymer-metal current collector to increase the relative weight rate of active materials in the battery. The weight rate of active materials of the present invention can be about 55%, compared with about 36% for current commercial SLI lead acid batteries. The present invention also optimizes the ratio of the interface area between the current collector and the active materials to the volume of the active materials, which greatly increases the utilization of active materials and then greatly increases the specific energy. Still another advantage of the present invention is that the utilization of active materials can be about 70%, compared with about 30% utilization for current commercial SLI lead acid batteries. Hence, the great increase of the weight rate and utilization of active materials of the present invention greatly increases the specific energy of the batteries. The long cycle life means that the cycle life of the lead acid batteries of the present invention is much longer than that of current commercial lead acid batteries. The special bonding layers on the current collector surfaces are used to achieve good adhesion between the current collector and active materials. A further advantage of the present invention is that there is no positive grid corrosion and negative grid sulfation. Such corrosion and sulfation greatly shorten the cycle life of current commercial lead acid batteries. The structure of the current collector can well hold the active materials, and is much better than the conventional lead grids in which the open grid structure makes active materials easily fall off from the grids. Yet a further advantage of the present invention is that all of the plates are directly fixed to the polymer case by polymer cement or thermal polymer glue, and hence the batteries have very good mechanical properties. Still a further advantage of the present invention is that the structure of the current collector and the good adhesion between the current collector and active materials make the lead acid batteries highly resistant to vibration damage. These mechanical properties are important for the applications of PHEV, HEV and EV. Yet still a further advantage of the present invention is that the ratio of the contact area between the grid/current collector system and active materials to volume of active materials is maximized, which makes the battery charge much faster than current commercial lead acid batteries.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1a, FIG. 1b, FIG. 1c, and FIG. 1d are front views of four embodiments of grid structures for a current collector, according to the present invention.

FIG. 1e and FIG. 1f are side cross-sectional views of FIG. 1d illustrating terminal and intermediate plate configurations, respectively.

FIG. 2a and FIG. 2b are side views of different coated-layer configurations for the terminal electrode plate in the current collector, according to the present invention.

FIG. 2c and FIG. 2d are side views of different coated-layer configurations for the intermediate electrode plate in the current collector, according to the present invention.

FIG. 4a is a schematic view of a monopolar configuration for the batteries, according to the present invention.

FIG. 4b is a schematic view of a bipolar configuration for the batteries, according to the present invention.

DESCRIPTION OF THE PREFERRED EMBODIMENT(S)

Figure 3B:
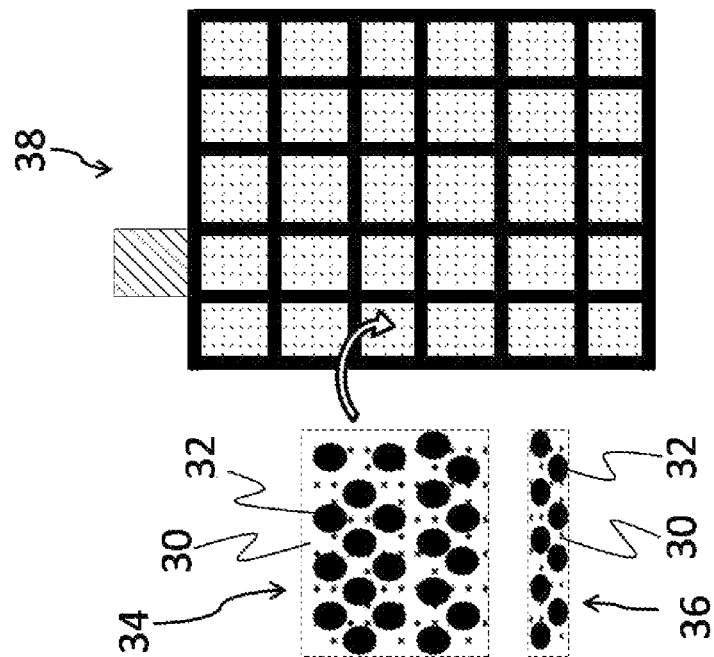
FIG. 3a and FIG. 3b are front views of bonding layers for the positive plates with different bonding composites, respectively, according to the present invention.

Referring now to the drawings, and in particular FIGS. 1a through 1d, four embodiments of a current collector for a lead acid battery, according to the present invention, are shown. As illustrated, a current collector for an intermediate electrode plate includes two polymer grids 10 and a metal foil 11 which is disposed between and sandwiched by the two polymer grids 10, and a current collector for a terminal electrode plate includes a polymer grid 10, a polymer sheet 12 and a metal foil 11 which is disposed between and sandwiched by the polymer grid and polymer sheet 12. The grids 10 may be of different structures. FIG. 1a, FIG. 1b, FIG. 1c, and FIG. 1d illustrate four embodiments of grid structures, 13, 14, 15, and 16, respectively, of a circle, diamond, honeycomb, and rectangular pattern. The area surrounded by the dash lines in FIG. 1d represents the size of the metal foil 11 disposed between and sandwiched by the polymer grids 10. FIG. 1e and FIG. 1f are side cross-sectional views of FIG. 1d for the terminal electrode plate 17 and intermediate electrode plate 18 configurations, respectively.

According to the present invention, active materials are supported by the grids 10. The grids 10 are made by lightweight polymers. A wide variety of sulfur-acid corrosive resistant polymers may be chosen as the grid materials, such as inexpensive polycarbonates, acrylonitrile butadiene styrene, polyethylene and polyvinyl chloride. The metal foil 11 is used to transfer electric current as well as to equalize temperature within the battery. The foils 11 can be any metals or alloys, such as aluminum and its alloys, copper and its alloys, nickel and its alloys, titanium and its alloys, iron and its alloys etc. However, aluminum is preferable since it is cheaper and lighter than others metals and alloys. The thickness of the foils 11 may be from about several micrometers to about several hundred micrometers. For the terminal electrode plates 17, the foils 11 can be very thin, but for the intermediate electrode plates 18, a suitable mechanical strength of the foil 11 is needed for coating the corrosion resistant layers on the two sides of the foil 11. The preferable thickness of the foils 11 may be in the range from about 10 micrometers to about 200 micrometers.

Various polymer process techniques, such as injection molding, casting, and the like, may be used to manufacture the polymer-metal current collector. The choice of the process techniques may depend on the type of polymers. It should be appreciated that these techniques are conventional and inexpensive.

The mesh size of the grid 10 may be optimized to get the best performance of the battery. Decreasing the grid mesh size will increase the ratio of the interface area between the grid mesh and the active materials to the volume of the active materials, and then increases the utilization of the active materials and shortens the charge time, and enhances the mechanical property of the plate. However, decreasing the grid mesh size will increase the ratio of the current collector weight to the active material weight, which may decrease the specific energy. The thickness of the porous active materials of the present invention can be about 6 millimeter, and the performance of the battery is good still. Hence, the thickness of grid 10 may be in the range from about several hundred micrometers to about 7 millimeters. This means that the thickness of the intermediate electrode plates 18 may be in the range from about several hundred micrometers to about 14 millimeters.

Referring to FIGS. 2a through 2d, the details of the coated layers, 22, 23, and 24, on the polymer and metal surfaces in the current collector are shown. The metal foil surface is coated by a sulfur-acid corrosive resistant and conductive composite 24 comprising a metal silicide and a binder. The metal silicides may be titanium silicides, niobium silicides, tantalum silicides or others. TiSi2 is preferable since it has low electrical resistivity (less than 18 μΩcm) and inexpensive (about $0.3/g). The particle size of the metal silicides may be from about several nanometers to about one hundred micrometers. Various binder materials for the composites may be used, such as polymers, epoxies, mixers of polymers and epoxies, or other suitable adhesives. The choice of the binder materials may depend on the type of the grid polymers. The thickness of the metal silicide composite may be from about several hundred nanometers to about several hundred micrometers. Testing revealed that about 1 micrometer thickness of the composite is enough to resist the corrosion. The preferable thickness may be in the range from about 20 micrometers to about 200 micrometers. It should be appreciated, however, that nanopowders of the metal silicides are expensive, and manufacturing the very thin composite film may be expensive.

The bonding layer 23 is to improve the adhesion between the metal silicide and active materials. For the negative electrode, the layer 23 is a composite comprising a carbon nanotube, a lead/lead alloy, a metal silicide and a binder. It should be appreciated that the carbon nanotubes play two roles: one is to support the electric conductive channels between the layer 24 and the active materials since the lead particles in layer 23 may be sulfurated during the discharging process of the battery, and another is to enhance the adhesion between the layer 23 and the active material.

Experiments revealed that carbon nanotubes are stable in the negative electrode. The carbon nanotubes may be single walled or multi walled carbon nanotubes. The diameters of the nanotubes may be from about several nanometers to about several hundred nanometers, and the lengths of the nanotubes may be from about several micrometers to about several hundred micrometers or even longer. Multi walled nanotubes are preferable since they are much cheaper (about $0.1/g) than single walled nanotubes (about $60/g). The particle sizes of lead/lead alloys may be from about several nanometers to about several hundred micrometers. The metal silicides may be titanium silicides, niobium silicides, tantalum silicides or others. TiSi2 is preferable since it has low electrical resistivity and is relatively inexpensive. The particle size of the metal silicides may be from about several nanometers to about several hundred micrometers. The volume rates of the three components, carbon nanotube, lead/lead alloys and metal silicides in the composite may vary in a broad range; for example, each component may be from about 1% to more than 80%. The volume rate for each component from about 10% to less than 50% is preferable. Various binder materials for the composites may be used, such as polymers, epoxies, mixers of polymers and epoxies, or other suitable adhesives. The thickness of the layer 23 may be from about several hundred nanometers to about several hundred micrometers. It should be appreciated that the choice of the binder materials may depend on the type of the binder material of the layer 24.

The surfaces of the polymer grids 10 are coated by the corrosive resistant and conductive layer 22. The layer 22 supplies an adhesive layer between the grid polymer surface and the active material. For the negative electrode, the layer 22 is a composite comprising a carbon nanotube, a lead/lead alloy and a binder. The carbon nanotubes may be single walled or multi walled carbon nanotubes. The diameters of the nanotubes may be from about several nanometers to about several hundred nanometers, and the lengths of the nanotubes may be from about several micrometers to about several hundred micrometers or even longer. Multi walled nanotubes are preferable since they are much cheaper than single walled carbon nanotubes. The particle sizes of lead/lead alloys may be from about several nanometers to about several hundred micrometers. The volume rates of the two components, carbon nanotube and lead/lead alloys in the composite may vary in a broad range; for example, each component may be from about 1% to more than 90%. The volume rate for each component from about 10% to less than 50% is preferable. Various binder materials for the composites may be used, such as polymers, epoxies, mixers of polymers and epoxies, or other suitable adhesives. The choice of the binder materials may depend on the type of the grid polymers. The thickness of the layer 22 may be in the range from about several hundred nanometers to about several hundred micrometers. It should be appreciated that, in this range, thinner is better for decreasing the weight of the grid and lowering the materials cost.

For the positive electrode, the bonding layer 23 in FIGS. 2a through 2d, is a composite comprising a lead/lead alloy, a metal silicide and a binder. The lead/lead alloy in the composite is used to improve the adhesion between the layer and active materials. The adhesion between the metal silicide 30 (FIGS. 3a and 3b) and the active material is very weak. The lead/lead alloys may have various forms in the composites, such as micro-grids 31, particles 32, bars, etc. The micro-grids 31 are preferable, however. Micro-grid means that the edge width and mesh dimensions of the grid are in micro scale, which may be from about several micrometers to about several hundred micrometers.

Figure 3A:
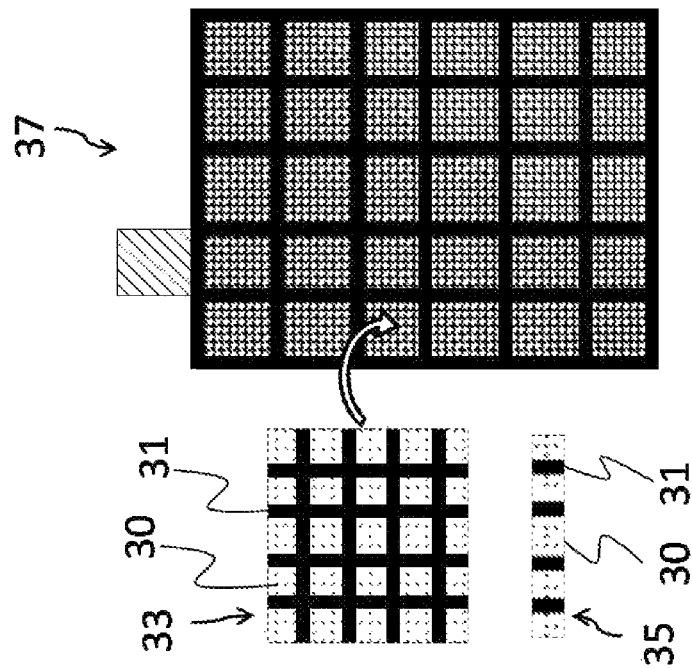

FIG. 3a and FIG. 3b illustrate the details of the configurations of the micro-grids 31 and the particles 32. Reference numerals 33 and 34 show the top views of the layer 23 in a cell of the polymer grid 10 for the configurations of the micro-grid 31 and the particles 32 respectively, and reference numerals 35 and 36 show the cross-sectional views of the layer for those of the micro-grid 31 and the particles 32, respectively. The volume rates of the two components, lead/lead alloys and metal silicides in the composite may vary in a broad range. The component volume rate of lead/lead alloys may be from about 10% to about 90%. About 50% of the volume rate for the lead/lead alloys is preferable. The metal silicides may be titanium silicides, niobium silicides, tantalum silicides or others. $TiSi_2$ is preferable since it has low electrical resistivity and is relatively inexpensive. The particle size of the metal silicides may be from about several nanometers to about several hundred micrometers. Various binder materials for the composites may be used, such as polymers, epoxies, mixers of polymers and epoxies, or other suitable adhesives. The thickness of the layer 23 may be from about several hundred nanometers to about several hundred micrometers. It should be appreciated that the choice of the binder materials may depend on the type of the grid polymers.

For the positive electrode, the layer 22 is a composite comprising a lead dioxide and a binder. It is well known that $PbO_2$ has excellent electric conductivity, similar to metallic Hg, about $104\Omega\text{-}1$ cm-1, and is acid corrosion resistant. The layer 22 plays the roles of electrical conducting and adhesive for the active material. The particle size of $PbO_2$ may be from about several nanometers to about several hundred micrometers. Various binder materials for the composite may be used, such as polymers, epoxies, mixers of polymers and epoxies, or other suitable adhesives. The choice of the binder materials may depend on the type of the grid polymers. The thickness of the layer 22 may be in the range from about several hundred nanometers to about several hundred micrometers. It should be appreciated that, in this range, thinner is better for decreasing the weight of the grid and lowering the materials cost.

FIG. 2a and FIG. 2b illustrate the different coated-layer configurations for the terminal electrode, and FIG. 2c and FIG. 2d illustrate the different coated-layer configurations for the intermediate electrode. The configurations in FIG. 2b and FIG. 2d illustrate the grids site just on the layer 23. It should be appreciated that such configurations may be convenient for manufacturing of the layers 23 and 24, but may cost more for the composite materials.

The current collectors can be configured as monopolar electrodes, 40, 41, 42 and 43, as illustrated in FIG. 4a or bipolar electrode 44 as illustrated in FIG. 4b. When the same active material (negative active material 45 or positive active material 46) is pasted in both sides of the current collector, the monopolar electrode is formed, and when the negative active material 45 is pasted in one side of the current collector and the positive active material 46 is pasted in another side, the bipolar electrode is formed.

The separator 47 in FIG. 4a and FIG. 4b may be porous polymer materials, adsorbed glass materials and other suitable materials. It should be appreciated that since the outmost-surfaces of all the plates of the present invention are polymers, it makes easy and cheap to assemble and seal the batteries just by using polymer cements or thermal polymer glues. It should also be appreciated that FIG. 4a is a monopolar configuration of the lead acid battery and FIG. 4b is a bipolar configuration of the lead acid battery.

EXAMPLE 1

A 2 V lead acid battery was built according to the monopolar configuration as shown in FIG. 4a. The grid structure, polycarbonate, and aluminum foil were chosen to make the current collector. The porous polymer was chosen as the separator.

Figure 5:
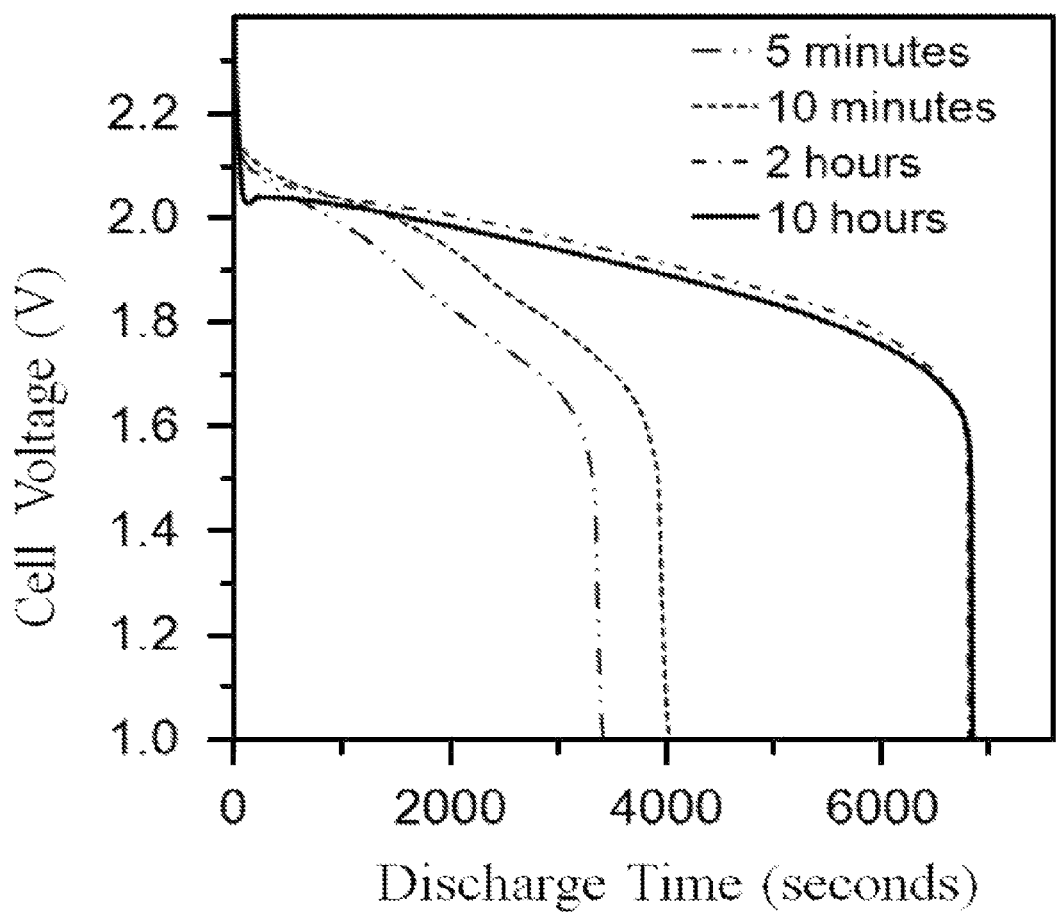
FIG. 5 is a graphic view illustrating discharge characteristics of a monopolar battery of the present invention at different charged times.

FIG. 5 shows the discharge characteristics of this battery at different charged times. The battery was discharging at 21° C. The charge is fast. 5 minutes can be charged to about 48% of the capacity, and 10 minutes to about 60% of the capacity. The battery can be fully charged in less than 2 hours. The utilization rate of the active materials was estimated based on experimental data, and is about 60%. The specific energy of this battery can be approximately calculated, and is about 83 Wh/kg. Cycle tests have been performed for more than three months and are ongoing, and results indicate that the change of the performance of the battery after more than 160 cycles is negligible.

EXAMPLE 2

A 6 V lead acid battery is built according to the bipolar configuration as shown in FIG. 4b. The grid structure, polycarbonate, and aluminum foil were chosen to make the current collector. The porous polymer was chosen as the separator.

Figure 6:
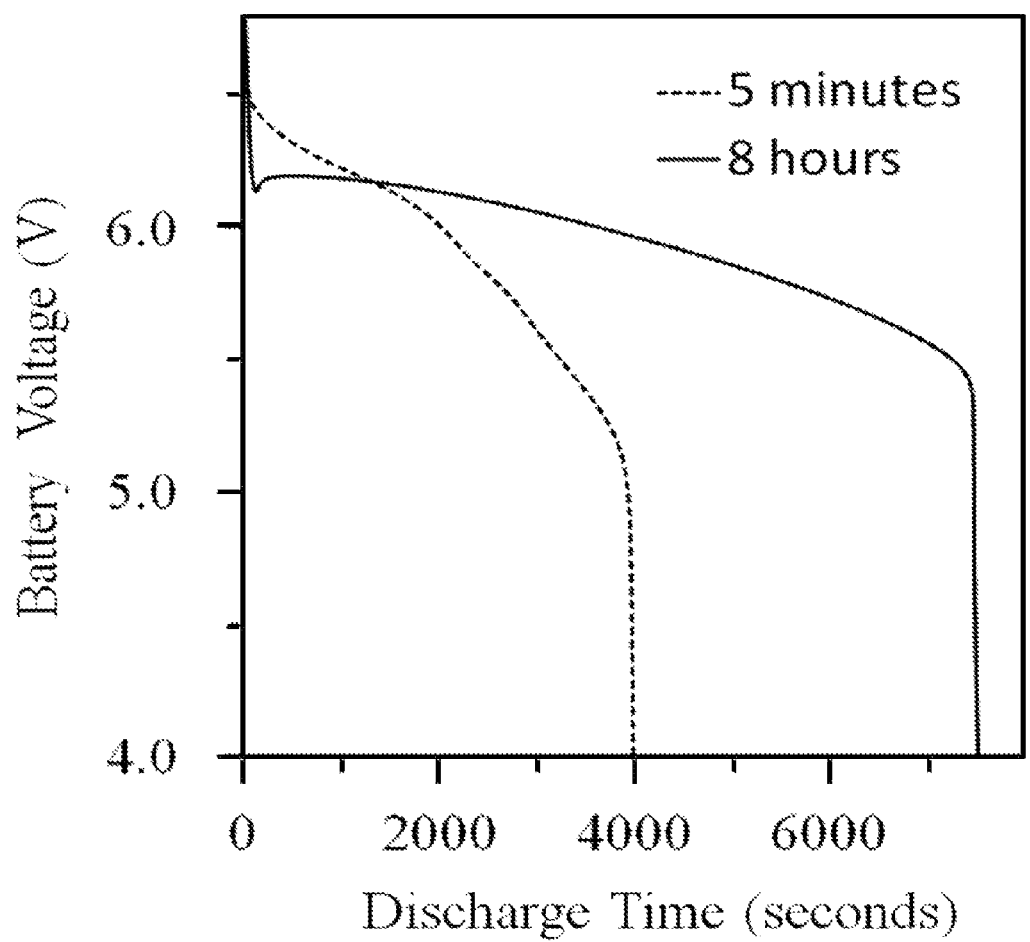
FIG. 6 is a graphic view illustrating discharge characteristics of a bipolar battery of the present invention at different charged times.

FIG. 6 shows the discharge characteristics of this battery at different charged times. The battery was discharging at 21° C. The charge is fast. 5 minutes can be charged to about 51% of the capacity. The battery can be fully charged in less than 2 hours. The utilization rate of the active materials was estimated based on experimental data, and is about 60%. Then, the specific energy of this battery can be approximately calculated, and is about 83 Wh/kg.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A current collector for an electrode plate of a lead acid battery comprising:
a plurality of polymer members, at least one of said polymer members having a plurality of apertures extending therethrough; and
a separate metal foil member coated by at least one layer of conductive and electrolyte-corrosion-resistant composite and having a thickness in a range of about 10 micrometers to about 200 micrometers disposed between said polymer members and covering one end of said apertures for preventing an electrolyte of the battery from passing through said apertures from one of said polymer members to another one of said polymer members.

2. A current collector as set forth in claim 1 wherein said current collector is configured as one of a monopolar electrode and a bipolar electrode.

3. A current collector as set forth in claim 1 wherein said polymer members comprise a polymer corrosive resistant to the electrolyte of the lead acid battery.

4. A current collector as set forth in claim 3 wherein said polymer is one of a polycarbonate, acrylonitrile butadiene styrene, polyethylene, and polyvinyl chloride.

5. A current collector as set forth in claim 1 wherein said metal foil member is one of aluminum and its alloys, copper and its alloys, nickel and its alloys, titanium and its alloys, and iron and its alloys.

6. A current collector as set forth in claim 1 wherein said at least one of said polymer members is a polymer grid forming said apertures.

7. A current collector as set forth in claim 1 wherein at least one of said polymer members is a polymer sheet.

8. A current collector as set forth in claim 6 wherein said polymer grid has meshes of said apertures in one of a circle, diamond, honeycomb, and rectangular patterns.

9. A current collector as set forth in claim 6 wherein said polymer grid has surfaces coated by a conductive and electrolyte-corrosion-resistant composite.

10. A current collector as set forth in claim 9 wherein, for a negative electrode, said composite comprises a carbon nanotube, a lead/lead alloy, and a binder.

11. A current collector as set forth in claim 10 wherein said carbon nanotube is one of single walled carbon nanotube and multi walled carbon nanotube.

12. A current collector as set forth in claim 10 wherein said binder is one of epoxies, said polymers of claim 4, mixers of polymers and epoxies, and polymer adhesives.

13. A current collector as set forth in claim 9, for a positive electrode, said composite comprises a lead dioxide and a binder.

14. A current collector as set forth in claim 13 wherein said binder is one of epoxies, said polymers of claim 4, mixers of polymers and epoxies, and polymer adhesives.

15. A current collector as set forth in claim 11 wherein said composite comprises a metal silicide and a binder.

16. A current collector as set forth in claim 15 wherein said metal silicide is one of titanium silicides, niobium silicides, and tantalum silicides.

17. A current collector as set forth in claim 15 wherein said binder is one of epoxies, said polymers of claim 4, mixers of polymers and epoxies, and polymer adhesives.

18. A current collector as set forth in claim 1 wherein said composite has a surface coated by a composite, for a negative electrode, comprising a lead/lead alloy, said carbon nanotube of claim 11, a metal silicide, and a binder, or for a positive electrode, comprising a lead/lead alloy, a metal silicide, and a binder.

19. A current collector as set forth in claim 18 wherein the lead/lead alloy is one of a lead/lead alloy micro-grid and lead/lead alloy powder.

20. A current collector as set forth in claim 18 wherein said metal silicide is one of titanium silicides, niobium silicides, and tantalum silicides.

21. A current collector as set forth in claim 18 wherein said binder is one of epoxies, said polymers is one of a polycarbonate, acrylonitrile butadiene styrene, polyethylene, and polyvinyl chloride, mixers of polymers and epoxies, and polymer adhesives.

22. A current collector as set forth in claim 19 wherein the micro-grid is a grid of which edge width and mesh dimensions are in micrometer scale.

23. A current collector for an electrode plate of a lead acid battery comprising:
a plurality of polymer members having a plurality of apertures extending therethrough, said polymer members being one of a polycarbonate, acrylonitrile butadiene styrene, polyethylene, and polyvinyl chloride, said polymer members having surfaces coated by a conductive and electrolyte-corrosion-resistant composite; and
a separate metal foil member disposed between said polymer members, said metal foil member is one of aluminum and its alloys, copper and its alloys, nickel and its alloys, titanium and its alloys, and iron and its alloys, said metal foil member having surfaces coated by a conductive and electrolyte-corrosion-resistant composite, said metal foil member covers one end of said apertures for preventing an electrolyte of the battery from passing through said apertures from one of said polymer members to another one of said polymer members.

* * * * *